(12) United States Patent
Smithgall et al.

(10) Patent No.: US 8,634,305 B2
(45) Date of Patent: Jan. 21, 2014

(54) TIME TRIGGERED ETHERNET SYSTEM TESTING MEANS AND METHOD

(75) Inventors: William Todd Smithgall, League City, TX (US); Brendan Hall, Eden Prairie, MN (US); Srivatsan Varadarajan, Saint Louis Park, MN (US)

(73) Assignee: Honeywell International Inc., Morristown, NJ (US)

(*) Notice: Subject to any disclaimer, the term of this patent is extended or adjusted under 35 U.S.C. 154(b) by 263 days.

(21) Appl. No.: 13/224,871

(22) Filed: Sep. 2, 2011

(65) Prior Publication Data

US 2013/0058217 A1    Mar. 7, 2013

(51) Int. Cl.
*G08C 15/00* (2006.01)

(52) U.S. Cl.
USPC ........................................... 370/241

(58) Field of Classification Search
USPC .................. 370/241–251, 503–519
See application file for complete search history.

(56) References Cited

U.S. PATENT DOCUMENTS

| | | | |
|---|---|---|---|
| 4,325,251 A | 4/1982 | Kanegae | |
| 4,839,812 A | 6/1989 | Nusser et al. | |
| 5,023,791 A | 6/1991 | Herzberg et al. | |
| 5,214,582 A | 5/1993 | Gray | |
| 5,541,863 A | 7/1996 | Magor et al. | |
| 5,828,321 A | 10/1998 | Matsuzaki | |
| 6,073,088 A | 6/2000 | Pryce et al. | |
| 7,171,345 B2 | 1/2007 | Mocek | |
| 7,817,654 B2 | 10/2010 | Augustin et al. | |
| 7,818,103 B2 | 10/2010 | Johansen et al. | |
| 8,214,487 B2 * | 7/2012 | Savoor et al. | 709/224 |
| 8,284,799 B2 * | 10/2012 | Diab et al. | 370/468 |
| 2006/0190155 A1 | 8/2006 | Meyer et al. | |
| 2006/0229777 A1 | 10/2006 | Hudson et al. | |
| 2007/0253323 A1 * | 11/2007 | Dapper et al. | 370/208 |
| 2009/0112569 A1 | 4/2009 | Angus et al. | |
| 2009/0271034 A1 | 10/2009 | Kalbavi et al. | |

FOREIGN PATENT DOCUMENTS

WO        2004059411 A1       7/2004

OTHER PUBLICATIONS

Kim et al, "A Real-time HWIL simulation Control System Architecture for Implementing Evaluation Environment of Complex Embedded Systems", IEEE, ICACT2011, Feb. 13-16, pp. 254-259.*
Kopetz, H., et al.; The Time-Triggered Ethernett (TTE) Design, Proceedings of the Eighth IEEE International Symposium on Object-Oriented Real-Time Distributed Computing (ISORC '05); Computer Society.

(Continued)

*Primary Examiner* — Thai Hoang
(74) *Attorney, Agent, or Firm* — Ingrassia Fisher & Lorenz, P.C.

(57) ABSTRACT

Methods and apparatus are provided for evaluating the performance of a Time Triggered Ethernet (TTE) system employing Time Triggered (TT) communication. A real TTE system under test (SUT) having real input elements communicating using TT messages with output elements via one or more first TTE switches during a first time interval schedule established for the SUT. A simulation system is also provided having input simulators that communicate using TT messages via one or more second TTE switches with the same output elements during a second time interval schedule established for the simulation system. The first and second time interval schedules are off-set slightly so that messages from the input simulators, when present, arrive at the output elements prior to messages from the analogous real inputs, thereby having priority over messages from the real inputs and causing the system to operate based on the simulated inputs when present.

20 Claims, 2 Drawing Sheets

(56) References Cited

OTHER PUBLICATIONS

Bartols, F., et al.; Performance Analysis of Time-Triggered Ether-Networks Using Off-The-Shelf-Components, 2011 14th IEEE International Symposium on Object/Component/Service-Oriented Real-Time Distributed Computing Workshops; Computer Society.
EP Search Report for EP 12173706.8-2416 dated Nov. 30, 2012.
EP Communication for EP 12173706.8-2416 dated Nov. 23, 2012.

* cited by examiner

TIME TRIGGERED ETHERNET SYSTEM TESTING MEANS AND METHOD

STATEMENT REGARDING FEDERALLY SPONSORED RESEARCH OR DEVELOPMENT

This invention was made with Government support under Government Contract # NNJ06TA25C awarded by NASA. The Government has certain rights in the invention.

TECHNICAL FIELD

The present invention generally relates to functional testing of complex systems, and more particularly relates to functional testing of complex systems employing Time-Triggered Ethernet (TTE) control and communication (C&C) protocols.

BACKGROUND

Complex electro-mechanical systems often employ communication networks interconnecting the various elements in the system, over which data, control signals, feedback signals and various other types of information (collectively "messages") are exchanged. Non-limiting examples of such complex systems are electrical distribution networks, power plants, refineries, manufacturing lines, ships, space-craft, air-craft, vehicles, industrial controls and so forth. "Ethernet" defined by IEEE Standard 802.3 is a well known system control and communication (C&C) protocol used in such systems. Recently, a more robust version of Ethernet better suited to mission critical applications has been developed, referred to as "Time Triggered Ethernet" (TTE) defined by SAE Standard AS6802. Various components for implementing Ethernet and TTE based communication and control (C&C) systems are commercially available.

A problem encountered with complex systems is the difficulty and expense of testing such systems to determine how they will operate under various circumstances. For example and not intended to be limiting, how does the system output change in response to various input changes, or what happens if some of the system elements encounter abnormal conditions, or what happens if one of several Ethernet communication paths degrades, and so forth? With large and complex systems it is not always possible to answer such questions merely by theoretical analysis and actual system tests are needed. In many cases the physical alterations needed to execute such tests are impractical (e.g., on a satellite in space) or prohibitively expensive (e.g., on a power distribution network) or for other reasons. Accordingly, it is desirable to provide a means and method for testing complex electrical, electro-mechanical, electronic and other systems employing Time Triggered Ethernet (TTE) C&C protocols. In addition, it is desirable to provide the capability to simulate various physical circumstances in place and without disassembling or reconstructing the physical system for each test. Furthermore, other desirable features and characteristics of the present invention will become apparent from the subsequent detailed description of the invention and the appended claims, taken in conjunction with the accompanying drawings and this background of the invention.

BRIEF SUMMARY

An apparatus (62) is provided for evaluating the performance of a control and communication (C&C) system (64). The apparatus (62) includes the real physical Time Triggered Ethernet (TTE) control and communication (C&C) system under test (SUT) (64), having real input elements (71, 72), adapted to communicate using time triggered (TT) communication protocols with real output elements (83-85; 73-75) via one or more first TTE switches (91, 92) during a first time interval schedule (44E-i, 44E-(i+1)) established for the SUT (64). The apparatus (62) further includes a simulation system (66) having input simulators (87, 88) that communicate using TT communication with the real output elements (83-85; 73-75) via one or more second TTE switches (93) during a second time interval (44S-i, 44S-(i+1)) schedule established for the simulation system (66). The first (44E-i, 44E-(i+1)) and second (44S-i, 44S-(i+1)) time interval schedules are off-set by amount Δt so that messages from the input simulators (87, 88) when present arrive at the output elements (83-85; 73-75) prior to messages from the real input elements (71, 72), thereby having priority over messages from the real input elements (71, 72) and causing the system to operate based on the messages from the input simulators (87, 88) when present.

A method is provided for in-place testing of Time Triggered Ethernet (TTE) command and control (C&C) system (64) having real input devices (71, 72) and output interfaces (83-85; 73-75) that communicate through one or more switches (91, 92) during first predetermined time intervals (44E-I, 44E-(i+1)) set by a time scheduling system (E-SCHEDULE 60) associated with the C&C system (64) as to when outputs from the real input devices (71, 72) can be sent to the output interfaces (83-85; 75). The method includes providing a simulation subsystem (66) having therein simulated input devices (87, 88) adapted to provide predetermined or dynamically calculated outputs mimicking the outputs of the real input devices (71, 72) and communicating with the output interfaces (83-85; 73-75) through at least a further switch (93) during second predetermined time intervals (44S-i, 44S-(i+1)) set by a time scheduling system (S-SCHEDULE 69) associated with the simulation subsystem system (66) as to when outputs from the simulated input devices (87, 88) can be sent to the output interfaces (83-85; 73-75), and adjusting the second predetermined time intervals (44S-i, 44S-(i+1)) relative to the first predetermined time intervals (44E-I, 44E-(i+1)), so that the outputs from the simulated input devices (87, 88) arrive at the output interfaces (83-85; 73-75) prior to the outputs from the real input devices (71, 72).

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Time Triggered Ethernet systems employ three communication classes of successively lower priority: (1) Time Triggered (TT) communication according to SAE AS6802 Standard, (2) Rate Constrained (RC) communication according to ARINC 664 Part 7 Standard, and Best Effort (BE) communication according to Ethernet IEEE 802.3 Standard. In TT communication, data or other signals ("messages") are transported in a time-triggered manner through the network. Sending elements, receiving elements and elements in between know, for example, by use of a pre-configured time base or schedule, at which point in time particular data or other messages should be transported from source to destination. For this reason a common time base or schedule is provided in such systems, synchronized across all devices or system elements. Confirmations are not necessary, since each system gateway, switch, etc., has the same time base or schedule information. TT communication provides the most robust and reliable communication and, other than time synchronization information, has the highest priority in the system.

Figure 1:
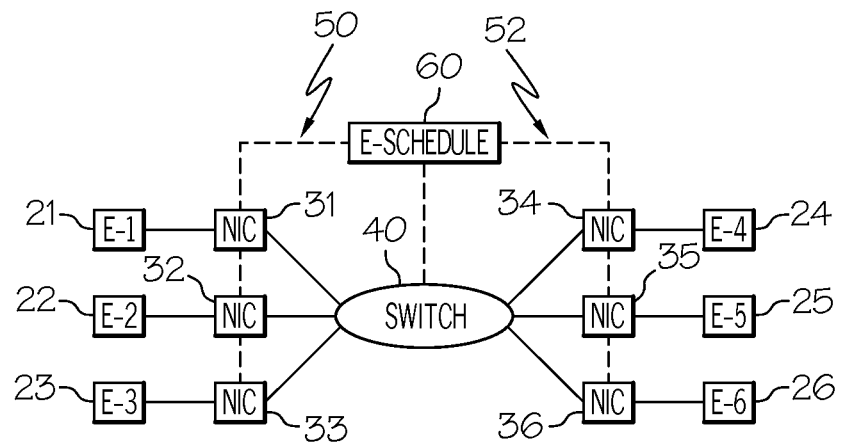
FIG. 1 illustrates a generic Ethernet control and communication (C&C) system according to the prior art.

FIG. 1 illustrates generic Ethernet control and communication (C&C) system 20 according to the prior art. System 20 includes, by way of example and not limitation, six individual system input-output (I/O) elements E-1 through E-6, identified by reference numbers 21 through 26 respectively, coupled to each other through switch 40. System elements 21-26 (E1-E6) are individually coupled to switch 40 via Network Interface Controllers (hereafter NICs) 31-36, and pathways or links 50, 52. System elements 21-26 (E1-E6) may be sensors, actuators, timers, displays, computers, control terminals and/or other input-output or data processing devices of any kind; e.g., whatever as needed to support the overall function of system 20. The term "effector" is used herein to refer generically to any output device. The term "computer" is used herein to refer generically to any intermediate data processing device, including control computers or processors. For convenience of explanation and not intended to be limiting, the embodiments illustrated herein show a distributed system consisting of separately packaged sensors, computers and effectors. Persons of skill in the art will understand that in various other embodiments, sensors, computers and effectors may be combined for packaging efficiency or distributed to place them close to the devices they sense and control. All such arrangements are useful and intended to be included. NICs 31-36 may be stand-alone units or may be integrated with system I/O elements 21-26 (E1-E6).

NICs 31-36 are the gateways or interfaces between end system I/O elements 21-26 (E1-E6) and switch 40 and insure that the messages sent to and from system I/O elements 21-26 (E1-E6) through switch 40 conform to the overall Ethernet C&C system message protocol. NICs 31-36 and their associated system I/O elements 21-26 (E1-E6) may be thought of as being the "leaves" of the network "tree" structure. System 20 of FIG. 1 illustrates only single switch 40, but in other systems, multiple switches are often employed. Multiple switches are used to allow greater numbers of system I/O elements E-$i$ where $i$=1, 2, 3, . . . N, to be interconnected and/or to introduce redundancy so that a more robust system can be provided. Such switches along with links 50, 52 may be considered the "branches" and "trunk" of the network tree structure of system 20. When system 20 is a TT communication system, NICs 31-36 and switch 40 have a common time reference schedule or time base, indicated symbolically by E-SCHEDULE 60. This is explained more fully in connection with system 20' of FIG. 2 and with FIG. 3.

Figure 2:
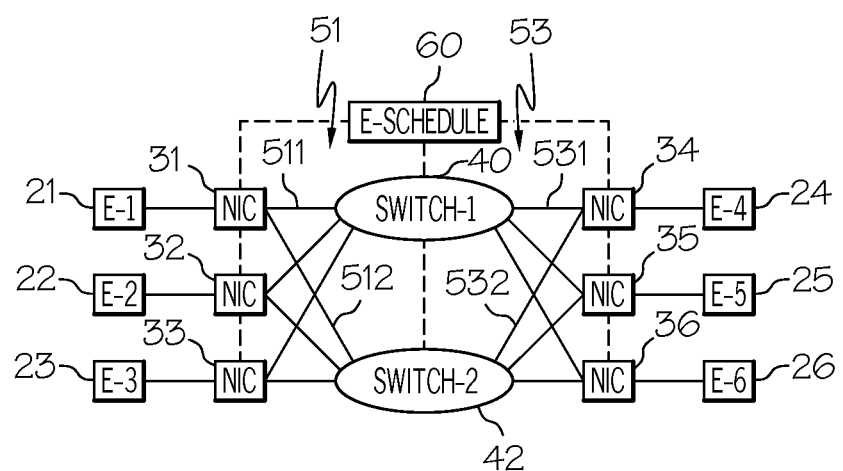
FIG. 2 illustrates an Ethernet control and communication (C&C) system employing redundancy, according to the prior art.

FIG. 2 illustrates Ethernet control and communication (C&C) system 20' employing redundancy, according to the prior art. Additional switch 42 has been added in system 20' linking system I/O elements 21-26 via NICs 31-36 and paths or links 51, 53 to make overall system 20' more robust. For purposes of explanation, assume that a signal generated by system I/O element 21 (E-1) is to be sent to system I/O element 24 (E-4) where it is intended to produce some action or desired outcome. In system 20', transmitting NIC 31 sends duplicate messages from system I/O element 21 (E-1) via links 51 to switch 40 (e.g., SWITCH-1) and switch 42 (e.g., SWITCH-2), which in turn transmit the duplicate messages via links 53 to NIC 34 coupled to I/O element 24 (E-4). A first of the duplicate messages goes from NIC 31 via link 511 to switch 40 and then via link 531 to NIC 34. A second of the duplicate messages goes from NIC 31 via link 512 to switch 42 and then via link 532 to NIC. 34. NIC 34 need only receive one of the two duplicate messages to pass it along to system I/O element 24 (E-4) for the message to be effective. Thus, either (but not both) of communication C&C paths 511-40-531 or 512-42-532 of system 20' of FIG. 2 can be defective and system 20' will still function. System 20' of FIG. 2 is therefore more robust than system 20 of FIG. 1. In the example of FIG. 2, analogous duplicate C&C paths also exist between remaining I/O elements 22, 23 and 25, 26 via their associated NICs 32, 33 and 35, 36.

With system 20' of FIG. 2, when both communication paths are functioning, NIC 34 receives both duplicate messages. In a Time Triggered Ethernet (TTE) system employing, for example TT communication, for such messages, NIC 34 is constrained to accept the first of the duplicate messages to arrive, discarding later duplicate messages. Switches 40, 42 test each incoming message to determine its relative arrival time within the assigned transmission time interval (e.g., interval 44 of FIG. 3) and to insure that it conforms to the expected format of a message originating from NIC 31 or such other NICs as are allowed to link to Switches 40, 42. Such overall system definition and allowed transmission time schedule information is stored, for example, in look-up tables accessible to the various NICs, switches, etc. Thus, messages arriving at NIC 34 (and other NICs) are tested both for allowable origin, format and timing. These features of TTE can be used to avoid undesirable message conflicts and fault-induced masquerading of one device as another.

Figure 3:
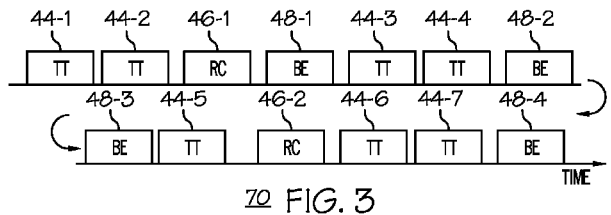
FIG. 3 illustrates a Time Triggered Ethernet system message time base or schedule, wherein specific time intervals are identified as being reserved for different types of communication.

As with system 20, system 20' employs a common time base or schedule represented symbolically by E-SCHEDULE 60 so that NICs 31-36 and switches 40, 42 share such common time base or schedule information. This is important since it allows high priority messages to be assigned to specific time slots for conflict-free time-triggered (TT) communication, while other messages (e.g., RC communication and BE communication messages) are naturally relegated to lower priority signaling intervals when TT communication messages are absent. FIG. 3 illustrates exemplary message time base or schedule 70 wherein specific time intervals 44-*i*, 46-*i*, 48-*i* (i=1, 2, 3, 4, etc.) are identified as being reserved for different types of communication. For example, time blocks or intervals 44-1, 44-2, 44-3, 44-4, 44-5, 44-6, 44-7 (collectively 44) are reserved for TT communication messages, time blocks or intervals 46-1, 46-2 (collectively 46) and time blocks or intervals 48-1, 48-2, 48-3, 48-4 (collectively 48) are reserved for RC communication messages and for BE communication messages, defined above. In Time Triggered Ethernet (TTE), TT communication messages are explicitly scheduled at specific times, while RC and BE communication messages are not explicitly scheduled, but "flow through" the available "holes" in the TT communication schedule. RC communication messages take priority over BE communication messages. Further, any message already in progress is allowed to complete regardless of priority. Therefore an explicitly scheduled TT communication message might have to wait on the completion of a non-scheduled BE communication message, so the maximum duration of another message has to be accounted for in the explicit TT communication schedule. This approach enables TTE to support "plain old Ethernet" (e.g., BE communication) flawlessly while also providing a provable guarantee of TT communication message delivery without conflict from lower traffic classes. This flexibility extends to the embodiments described herein and is a valuable characteristic of the present invention.

Figure 4:
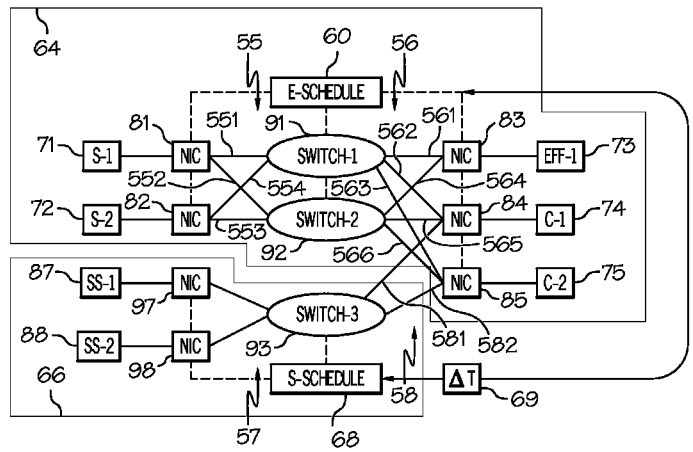
FIG. 4 illustrates an Ethernet control and communication (C&C) system according to an embodiment of the invention in which system behavior may be tested or evaluated in place for various changes in circumstances.

E-SCHEDULE 60 is shown in FIGS. 1-2 and 4 as if it were a separate sub-network sending timing information to all NICs and switches, but that is not essential and E-SCHEDULE 60 shown in FIGS. 1-2 and 4 is intended to symbolically represent the common time base or schedule (e.g., such as illustrated in FIG. 3) available to all system elements, however such common time base or schedule information is provided. In many physical realizations of TTE each NIC and switch incorporates an internal clock, which clocks are kept in synchronism via messages passed through the network using, for example, links or paths 50-53, and each NIC and switch has available the time base or schedule when different kinds of communications are allowed. Such synchronizing messages are referred to as Protocol Control Frames (PCFs) and have the highest priority of any network traffic. For the purposes of this invention it does not matter how time discipline or scheduling is provided, merely that it exists in the overall system and is used (e.g., in TTE) to permit certain classes of messages to be accepted and others discarded depending upon when they are transmitted and received within their specified time intervals.

FIG. 4 illustrates Time Triggered Ethernet (TTE) control and communication (C&C) system 62 with built-in test capability, according to an embodiment of the invention. With system 62, the behavior of a real physical system (e.g., system 64) may be tested or evaluated in place for various changes in circumstances. System 62 includes real physical system 64 and simulation sub-system 66. System 64 illustrates an exemplary TTE physical control and communication (C&C) system under test (SUT), and subsystem 66 illustrates a parallel TTE simulation system (SS) coupled, in this example, to computing and output elements (e.g., elements 73-75) of SUT 64 in such a way that the behavior of SUT 64 can be evaluated in place without disassembling or otherwise disturbing actual physical C&C system 64.

SUT 64 includes exemplary system I/O elements 71-75 coupled to each other via NICs 81-85, switches 91, 92 (e.g., SWITCHES 1 and 2) and paths or links 551, 552, 553, 554 (collectively 55) and 561, 562, 563, 564, 565, 566 (collectively 56). Such I/O elements, NICs, switches and paths are analogous to equivalent elements or components described in connection with FIGS. 1-2 and may be of any of the various types discussed earlier. For convenience of explanation and not intended to be limiting, it is assumed in connection with sub-system 64 of FIG. 4, that I/O elements 71 and 72 are sensor S-1 and S-2 providing physical parameter inputs to physical SUT 64, and that I/O element 73 is an effector. For convenience of explanation and not limitation, I/O elements 74, 75 are presumed to embody computers or other control elements adapted to receive physical inputs from sensors 71, 72 (S-1, S-2), perform various calculations or transformations using such information, and provide a control signal to I/O element (e.g., effector) 73 thereby causing I/O element 73 to perform some desired action. As used herein, the terms "computers" and "control elements" are not limited merely to conventional processors or micro-processors but are intended to include any devices or elements that that can modify the signals received from I/O elements 71, 72 as may be needed so that they can activate effector 73. The term "effector" is intended to include any type of output device that causes a physical change of some sort. Non-limiting examples of "effectors" are displays, data-loggers, control valves, throttles, switches, rheostats, information storage devices, hydraulic or pneumatic actuators, linear or rotary actuators, lamps, alarms, and so forth. The combination of NICs 83-85 and I/O elements 73-75 are also referred to as output elements or output interfaces 83-85; 73-75.

Physical C&C system 64 functions under the standard TTE/TT C&C protocol based on a common time base or time schedule (e.g., analogous to that of FIG. 3), represented symbolically by E-SCHEDULE 60 shared by the various elements of system 64. Under the standard TT communication protocol, sensor readings originating in I/O elements 71, 72 are communicated to I/O elements 73-75 during predetermined time intervals (e.g., TT communication intervals 44 of FIG. 3) determined by the common time base or schedule represented by E-SCHEDULE 60. System 64 is, by way of example, a redundant system but this is not essential. As has been explained in connection with system 20' of FIG. 2, under the standard TT communication protocol, whichever message (e.g., sensor readings from I/O elements 71 and/or 72) arrives first at NICs 84-85 during the predetermined transmission interval for such messages, is accepted and any duplicate messages arriving later in the predetermined transmission interval from the same source, e.g., by a different network path, are discarded. Thus, system 64 automatically accepts or discriminates against TT communication messages based on their relative arrival time during the predetermined transmission interval (e.g., interval 44 FIG. 3). It has been found that this capability of TTE systems can be used to advantage to permit operational testing of complex C&C systems in place, that is, without disassembling the system or removing or modifying the relevant I/O elements (e.g., elements 71, 72 in the example of FIG. 4).

Subsystem 66 includes simulation input elements 87, 88 (SS-1, SS-2) designed to selectively mimic the outputs of input sensors 71, 72, associated NICs 97, 98 and switch 93 (e.g., SWITCH-3), providing whatever sensor outputs are desired to be simulated. Simulation input element 87, 88 are programmable to the extent that they can provide to associated NICs 97, 98 whatever synthetic sensor readings are desired to be used to test the behavior of system 64 under such circumstances. Persons of skill in the art will understand that simulation input elements 87, 88 are identified as "sensors"

merely to facilitate explanation and that they represent any type of system input element whose output is desired to be varied to evaluate the actual performance of physical system-under-test (SUT) 64 in response to such changes. Paths or links 57 couple NICs 97, 98 to switch 93 (e.g., SWITCH-3). Paths or links 58 couple switch 93 of sub-system 66 to NICs 84, 85 of physical system 64. Thus, whatever parameter values are being provided by simulation input elements 87, 88 of simulation subsystem 66 can be communicated to receiving NICs 83-85, and to associated computers or control elements 74, 75 and eventually to output effector 73 of real physical system 64.

The transmission of signals or messages originating from simulated input elements 87, 88 of simulation sub-system 66 to I/O element 73-75 via associated NICs 83-85 of real physical system 64 is controlled by the time base or time schedule associated with simulation sub-system 66, represented symbolically by S-SCHEDULE 68, and not by the time base or time schedule associated with real physical system 64 represented symbolically by E-SCHEDULE 60. It has been found that by appropriately adjusting the time schedule represented by S-SCHEDULE 68 of simulation sub-system 66 relative to the time schedule represented by E-SCHEDULE 60 of real physical system 64, that real physical system 64 can be made to accept without conflict the data or signals originating from simulation inputs 87, 88 as if they originated from real system inputs 71, 72. This permits the behavior of real physical system 64 in response to the simulated sensor (or other) inputs to be directly evaluated. Furthermore, once simulation sub-system 66 has been installed and coupled to real physical system 64, physical system 64 need not be disassembled or otherwise modified in order to conduct any test within the capabilities of simulated sensors 87, 88 (S-1, S-2). Unless simulated data is being provided by simulation sub-system 66, physical C&C system 64 functions as if simulation system 66 is not present. Thus, by providing simulation input elements (e.g., 87, 88), associated NICs (e.g., 97, 98) and further switch 93 of simulation sub-system 66, coupled to the appropriate NICs and I/O element of physical system 64, the response of physical C&C system 64 can be evaluated in real time in response to changes of any number of input parameters. Such testing and C&C evaluation may be carried out remotely and without further modification of real physical C&C system 64. Thus, the TTE testing system described above is especially suitable for use where physical modification of a system (e.g., system 64) for test purposes is impractical (e.g., on a fully assembled aircraft or a satellite) or prohibitively expensive (e.g., with a power or gas or fuel transmission system extending over vast distances or with other complex systems). This is a significant advance in the art.

A simulation input element can be programmable so as to mimic input X as if from a real input sensor during one test and input Y or Z during other tests, so long as such inputs do not need to be provided at the same time. The complexity of simulation sub-system 66, e.g., the number of simulation inputs, NICs and switches, depends on the number of simultaneous input variable changes that need to be provided to evaluate behavior of the physical system. The example of FIG. 4 shows simulation sub-system 66 capable of simultaneous and independent variation of two variable input sources provided by simulation input elements 87, 88 (e.g., SS-1, SS-2). Any number of simulation inputs, associated NICs and switches can be provided to allow real-time testing of real physical C&C system 64 of whatever complexity and simultaneously varied parameters as are needed.

As has been previously explained (e.g., see FIG. 3), Time Triggered Ethernet (TTE) with Time Triggered (TT) communication provides that TT communication messages are transmitted during predetermined intervals controlled by the system time base symbolically represented by E-SCHEDULE 60, and as is further explained, only the first message of the proper format arriving at the destination NIC during the predetermined communication interval will be accepted and acted upon. This is a specified feature of the TTE/TT protocol. It has been found that by providing an appropriate offset $\Delta t$ of the time base or time schedule (e.g., S-SCHEDULE 68) of simulation sub-system 66, that when sub-system 66 is activated messages originating in simulation sub-system 66 are presented to the appropriate NICs of real system 64 slightly ahead of analogous messages originating within system 64 (controlled by E-SCHEDULE 60). This is indicated symbolically by ($\Delta t$) block 69 relating E-SCHEDULE 60 and S-SCHEDULE 68 of FIG. 4 and further illustrated in FIG. 5.

Figure 5:
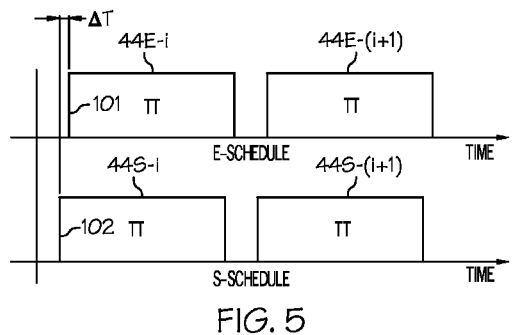
FIG. 5 shows a time scheduling chart illustrating message transmission intervals associated with the system of FIG. 4 that allows simulated data to be introduced to evaluate the behavior of the system of FIG. 4 under predetermined test conductions.

FIG. 5 shows time scheduling chart 70 illustrating message transmission intervals associated with the system of FIG. 4 that allows simulated data to be introduced to evaluate the behavior of the system of FIG. 4 under predetermined test conductions. FIG. 5 illustrates message transmission intervals 44E-$i$, 44E-($i$+1) associated with E-SCHEDULE 60 of real physical system 64 and transmission intervals 44S-$i$, 44S-($i$+1) associated with S-SCHEDULE 68 of simulation sub-system 66, both on a common time line. Transmission window 44S-$i$, 44S-($i$+1) for TT communication messages originating in simulation sub-system 66 operating under S-SCHEDULE 68 is advanced in time schedule by amount ($\Delta t$) compared to transmission window 44E-$i$, 44E-($i$+1) for analogous messages originating in real physical system 64 operating under E-SCHEDULE 60. This insures that the messages originating from simulation elements 87, 88 arrive before any input messages arriving from real inputs 71, 72 during the allowed communication interval. Because of the "first to arrive" preference built into TTE C&C systems using TT communication, the simulated "sensor" inputs from simulation elements 87, 88 are accepted in preference to any real inputs originating from real "sensors" 71, 72. Once simulation sub-system 66 is provided, this is accomplished without any physical modification of sensors 71, 72 or altering the connections thereto. This permits the behavior of real system 64 to be directly evaluated under the conditions represented by the simulation inputs, and without physical alteration of real system 64 or replacing sensors or changing the environmental conditions detected by the real sensors in real system 64.

The exact choice of $\Delta t$ has to do with the synchronization precision of the system-under-test (SUT). $\Delta t$ must be large enough to guarantee first arrival, but not so large as to be mistaken as a separate occurrence of the message. $\Delta t$ is achieved by adjusting the TT communication message schedule event times in sub-system 66. The TTE synchronization protocol ensures that sub-systems 64 (the SUT) and 66 (the Simulator) will have a common, synchronous time base. It is the explicit timing of the message events in 66 (defined in S-SCHEDULE 68) that must be adjusted to occur early by $\Delta t$ compared to the message events in 64 (defined in E-SCHEDULE 60) that achieves the early arrival of the sensor messages from sub-system 66 to sub-system 64. Likewise, the TT communication message schedule in SUT 64 must be constructed with allowance for $\Delta t$ in sub-system 66, and with proper tolerance on message arrival windows such that the early messages from sub-system 66 are not rejected. For systems using what is referred to as "Gigabit Ethernet" (e.g., 1000BASE-T, 1000BASE-CX, 1000BASE-SX, 1000BASE- LX, etc.), it has been found that schedule modification times Δt in the range of 15 to 30 microseconds are useful, with about 20 microseconds preferred, but longer and shorter times may also be used depending upon the particular TTE C&C system being evaluated. For systems using what is referred to as "100 Megabit Ethernet" (e.g., 100BASE-TX, 100BASE-FX, etc.), it has been found that schedule modification times Δt in the range of 150 to 300 microseconds are useful, with about 200 microseconds preferred, but longer and shorter times may also be used depending upon the particular TTE C&C system being evaluated. For systems using what is referred to as "10 Megabit Ethernet" (e.g., 10BASE-T, etc.), it has been found that schedule modification times Δt in the range of 1500 to 3000 microseconds are useful, with about 2000 microseconds preferred, but longer and shorter times may also be used depending upon the particular TTE C&C system being evaluated. Stated another way, Δt should be at least about 15 microseconds.

To give a simple example, assume that the behavior of the C&C system of an aircraft is desired to be observed in response to a change in external air pressure, with other environmental variables remaining the same. To perform a physical test of such C&C system if would be necessary to locally modify the air pressure surrounding the aircraft or the real pressure sensor, which may be a formidable and expensive task. Using the arrangement of system 62, the simulated external air pressure data is substituted via simulation sub-system 66 and the behavior of the aircraft C&C system directly observed without any need to modify the real physical environment in which the plane or the real sensor is located. This is an extremely useful capability of great practical significance for evaluating the performance of very complex C&C systems under a variety of pre-determinable variations in stimuli or other parameters. Based on the explanation herein, persons of skill in the art will understand that as many different input parameters as desired may be substituted, one at a time or concurrently, as are necessary to achieve the objectives of the test or simulation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method is provided for in-place testing of Time Triggered Ethernet (TTE) command and control (C&C) system having real input devices and output interfaces that communicate through one or more switches during first predetermined time intervals set by a time scheduling system associated with the C&C system as to when outputs from the real input devices can be sent to the output interfaces, comprising:
   providing a simulation subsystem having therein simulated input devices adapted to provide predetermined or dynamically calculated outputs mimicking the outputs of the real input devices and communicating with the output interfaces through at least a further switch during second predetermined time intervals set by a time scheduling system associated with the simulation subsystem as to when outputs from the simulated input devices can be sent to the output interfaces; and
   adjusting the second predetermined time intervals relative to the first predetermined time intervals, so that the outputs from the simulated input devices arrive at the output interfaces prior to the outputs from the real input devices.

2. The method of claim 1, wherein the adjusting step comprises adjusting the second predetermined time intervals relative to the first predetermined time intervals, so that the inputs from the simulated inputs arrive at the one or more output interfaces prior to the inputs from the input devices by an amount Δt of at least about 15 microseconds.

3. The method of claim 1, wherein Δt is in the range of about 150 to 300 microseconds for systems using 100 Megabit Ethernet.

4. The method of claim 1, wherein Δt is in the range of about 1500 to 3000 microseconds for systems using 10 Megabit Ethernet.

5. The method of claim 1, wherein the one or more output interfaces comprise serially coupled network interface controllers and output elements, and wherein the network interface controllers determine for each serially coupled output element the relative time of arrival of outputs from the input devices and outputs from the simulated input devices, and transmit only the first to arrive to the serially coupled output elements.

6. The method of claim 5, wherein the serially coupled output elements comprise one or more computers or control elements and at least one effector, and wherein the one or more computers or control elements receive the first to arrive outputs from the input devices, transform them and send them to the at least one effector to change the state thereof.

7. The method of claim 1, wherein the one or more output interfaces comprises an actuator and at least one computer or control element, and the simulated output from the simulated input devices is received first by the at least one computer or control element, modified therein and then transmitted to the actuator to change the state of the actuator.

8. The method of claim 7, wherein the one or more output interfaces further comprise network interface controllers serially coupled to the actuator and the at least one computer or control element for determining which of the outputs from the input devices and the outputs from the simulated input devices is the first to arrive and then sending the first to arrive outputs to the at least one computer or control element.

9. A system having built-in test simulation capability, comprising:
   a real sub-system portion of the system, comprising:
      one or more real input sensors;
      one or more output interfaces; and
      one or more first switches coupling the real input sensors and the one or more output interfaces;
   wherein the real input sensors, first switches and one or more output interfaces communicate under a Time Triggered Ethernet (TTE) control and communication (C&C) protocol wherein messages from the real input sensors to the one or more output interfaces are Time Triggered (TT) communications messages occurring during a predetermined first time interval established by a time schedule operation of the real sub-system portion of the system; and
   a simulation sub-system portion of the system, comprising:
      one or more input simulators adapted to provide predetermined or dynamically calculated output values mimicking operation of the real input sensors over a desired range of output values; and one or more second switches adapted to couple the output values from the one or more input simulators to the one or more output interfaces under a Time Triggered Ethernet (TTE) control and communication (C&C) protocol;

wherein messages from the input simulators to the one or more output interfaces are Time Triggered (TT) communications occurring during a predetermined second time interval at least partly overlapping the first time interval and established by a time schedule controlling operation of the simulation sub-system portion of the system, wherein a beginning of the second time interval precedes a beginning of the first time interval by an amount $\Delta t$.

10. The system of claim 9, wherein the amount $\Delta t$ is at least about 15 microseconds.

11. The system of claim 9, wherein $\Delta t$ lies in the range of about 150 to 300 microseconds for systems using 100 Megabit Ethernet.

12. The system of claim 9, wherein $\Delta t$ lies in the range of about 1500 to 3000 microseconds for systems using 10 Megabit Ethernet.

13. The system of claim 9, wherein the one or more output interfaces comprise serially coupled network interface controllers and output elements, and wherein the network interface controllers determine which of the output values from the input simulators or the real inputs is first to arrive and sending the first to arrive to the output elements.

14. The system of claim 13, wherein the serially coupled output elements comprise one or more computers or control elements and at least one effector, and wherein the one or more computers or control elements receive the first to arrive outputs, transform them and send them to the at least one effector to change the state thereof.

15. The system of claim 9, wherein the one or more output interfaces comprises an actuator and at least one computer or control element, and the output from the input simulators is received first by the at least one computer or control element, modified therein and then transmitted to the actuator to change the state of the actuator.

16. The system of claim 15, wherein the one or more output interfaces further comprise network interface controllers serially coupled to the actuator and the at least one computer or control element for determining which of the outputs from the input sensors and simulated outputs from the simulated input sensors is the first to arrive and then sending the first to arrive inputs to the at least one computer or control element.

17. An apparatus for evaluating the performance of a control and communication (C&C) system, comprising:

a real physical Time Triggered Ethernet (TTE) control and communication (C&C) system under test (SUT), comprising real input elements, adapted to communicate using time triggered (TT) communication protocols with real output elements via one or more first switches during a first time interval schedule established for the SUT;

a simulation system having input simulators that communicate using TT communication with the real output elements via one or more second switches during a second time interval schedule established for the simulation system;

wherein the first and second time interval schedules are off-set by amount $\Delta t$ so that messages from the input simulators when present arrive at the output elements prior to messages from the real input elements, thereby having priority over messages from the real input elements and causing the system to operate based on the messages from the input simulators when present.

18. The apparatus of claim 17, wherein the amount $\Delta t$ is at least about 15 microseconds.

19. The apparatus of claim 17, wherein, the output elements comprise one or more serially coupled network interface controllers and output processors or effectors.

20. The apparatus of claim 17, wherein, the output elements comprise one or more network interface controllers adapted to receive signals transmitted by the one or more first and second switches and send them to one or more output processors for manipulating the signals received from the first and second switches and transmitting such manipulated signals to an effector to change its state.

* * * * *